United States Patent
Lin et al.

(10) Patent No.: US 11,054,868 B2
(45) Date of Patent: Jul. 6, 2021

(54) LIFTING HINGE MODULE AND ELECTRONIC DEVICE HAVING THE SAME

(71) Applicants: Che-Hsien Lin, Taipei (TW); Che-Hsien Chu, Taipei (TW)

(72) Inventors: Che-Hsien Lin, Taipei (TW); Che-Hsien Chu, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 0 days.

(21) Appl. No.: 16/744,084

(22) Filed: Jan. 15, 2020

(65) Prior Publication Data

US 2020/0241603 A1 Jul. 30, 2020

Related U.S. Application Data (60) Provisional application No. 62/793,363, filed on Jan. 16, 2019.

(51) Int. Cl.
*E05D 7/00* (2006.01)
*G06F 1/16* (2006.01)
*E05D 3/02* (2006.01)

(52) U.S. Cl.
CPC ............ *G06F 1/1681* (2013.01); *E05D 3/02* (2013.01); *E05D 7/00* (2013.01); *G06F 1/1616* (2013.01); *G06F 1/1656* (2013.01); *G06F 1/1662* (2013.01); *E05Y 2900/606* (2013.01)

(58) Field of Classification Search
CPC ............ E05D 7/00; E05D 3/02; G06F 1/1681
See application file for complete search history.

(56) References Cited

U.S. PATENT DOCUMENTS

| | | | | |
|---|---|---|---|---|
| 8,474,103 B2* | 7/2013 | Lee | ......... | F24C 15/023 16/370 |
| 8,572,811 B2* | 11/2013 | Lautenschlager | .... | A47B 88/473 16/370 |
| 8,806,718 B2* | 8/2014 | Elkasevic | ......... | E05F 5/02 16/286 |
| 2003/0213098 A1* | 11/2003 | Cummins | ......... | E05F 1/1276 16/286 |
| 2007/0101542 A1* | 5/2007 | Lee | ......... | E05F 1/1276 16/286 |

(Continued)

FOREIGN PATENT DOCUMENTS

TW 200928678 7/2009

*Primary Examiner* — Jason W San
(74) *Attorney, Agent, or Firm* — JCIPRNET (57) ABSTRACT

A lifting hinge module includes a first bracket, a rotating shaft rotatably connected to the first bracket, a driving bracket disposed on the rotating shaft, a first guiding bracket disposed on the first bracket, a second guiding bracket disposed on the first bracket and spaced from the first guiding bracket, a sliding link having a first end rotatably connected to the driving bracket and a second end slidably connected to the first guiding bracket, and a supporting link rotatably connected to a second end of a sliding link and slidably connected to the second guiding bracket. When the rotating shaft rotates relative to the first bracket, the driving bracket is adapted to drive the second end of the sliding link to slide relative to the first guiding bracket, and the sliding link is adapted to drive the supporting link to slide and lift relative to the second guiding bracket.

20 Claims, 11 Drawing Sheets

(56) References Cited

U.S. PATENT DOCUMENTS

| | | | |
|---|---|---|---|
| 2010/0212112 A1* | 8/2010 | Steurer | E05F 1/1261 |
| | | | 16/286 |
| 2017/0139446 A1* | 5/2017 | Lan | F16M 13/005 |
| 2017/0139663 A1* | 5/2017 | Ahn | G06F 1/1618 |
| 2017/0208703 A1* | 7/2017 | Lin | H05K 7/16 |
| 2019/0094918 A1* | 3/2019 | Lin | G06F 1/166 |
| 2020/0080357 A1* | 3/2020 | Lin | G06F 1/1641 |
| 2020/0392983 A1* | 12/2020 | Chang | E05D 11/06 |
| 2021/0011525 A1* | 1/2021 | Lin | G06F 1/1681 |

* cited by examiner

LIFTING HINGE MODULE AND ELECTRONIC DEVICE HAVING THE SAME

CROSS-REFERENCE TO RELATED APPLICATION

This application claims the priority benefit of U.S. provisional application Ser. No. 62/793,363, filed on Jan. 16, 2019. The entirety of the above-mentioned patent application is hereby incorporated by reference herein and made a part of this specification.

BACKGROUND

Technical Field

The disclosure relates to a lifting hinge module, and particularly to a lifting hinge module arranged in an electronic device to facilitate heat dissipation.

Description of Related Art

In the conventional notebook computers, the host and the display body are connected with each other through a hinge structure. The host is configured to carry various electronic components and a keyboard. The keyboard is mounted at the top of the host, and forms a closed structure with the host. A gap between the keyboard and the electronic components is very small, which lowers heat dissipation efficiency of the host and, in turn, the electronic components may go overheating. As a result, the performance thereof becomes not favorable. Currently, solutions such as additionally mounting a heat dissipation module or expanding the internal space of the host have been proposed. However, these solutions increase the volume of the notebook computer and are in conflict with the trend for pursuing a compact design. In addition, the keyboards of the conventional notebook computers are generally disposed flatly, which does not meet the ergonomics.

In view of the above, developing a notebook computer exhibiting favorable heat dissipation efficiency and meeting the ergonomics is now an issue to work on.

SUMMARY

The disclosure provides a lifting hinge module and an electronic device. When the electronic device is switched to an open state, a keyboard of the electronic device may be synchronously lifted and moved through the lifting hinge module in an opening process, so that the heat dissipation efficiency is favorably improved, and the position of the keyboard better meets the ergonomics.

The lifting hinge module of the disclosure includes a first bracket, a rotating shaft, a driving bracket, a first guiding bracket, a second guiding bracket, a sliding link and a supporting link. The rotating shaft is rotatably connected to the first bracket. The driving bracket is disposed on the rotating shaft. The first guiding bracket is disposed on the first bracket. The second guiding bracket is disposed on the first bracket, and is spaced from the first guiding bracket. The sliding link has a first end and a second end. The first end is rotatably connected to the driving bracket, and the second end is slidably connected to the first guiding bracket. The supporting link is rotatably connected to a second end of a sliding link, and is slidably connected to the second guiding bracket. When the rotating shaft rotates relative to the first bracket, the driving bracket is adapted to drive the second end of the sliding link to slide relative to the first guiding bracket, and the sliding link is adapted to drive the supporting link to slide and lift relative to the second guiding bracket.

The electronic device of the disclosure includes a first body, a keyboard, a second body, and at least one lifting hinge module. The keyboard is disposed on the first body. The at least one lifting hinge module is disposed between the first body and the second body, and the at least one lifting hinge module includes a first bracket, a rotating shaft, a driving bracket, a second bracket, a first guiding bracket, a second guiding bracket, a sliding link, and a supporting link. The first bracket is connected to the first body. The rotating shaft is rotatably connected to the first bracket. The driving bracket is disposed on the rotating shaft. The second bracket is disposed on the rotating shaft, and is connected to the second body. The first guiding bracket is disposed on the first bracket. The second guiding bracket is disposed on the first bracket, and is spaced from the first guiding bracket. The sliding link has a first end and a second end. The first end is rotatably connected to the driving bracket, and the second end is slidably connected to the first guiding bracket. The supporting link is rotatably connected to a second end of a sliding link, and is slidably connected to the second guiding bracket. When the second body and the second bracket drive the rotating shaft to rotate relative to the first bracket, the driving bracket is adapted to drive the second end of the sliding link to slide relative to the first guiding bracket, and the sliding link is adapted to drive the supporting link to slide and lift relative to the second guiding bracket, so that the keyboard slides and lifts relative to the first body.

Based on the above, the lifting hinge module of the disclosure is adapted to be connected to the first body, the second body, and the keyboard of the electronic device. When the second body is opened relative to the first body, the second end of the sliding link may be driven by the driving bracket to slide relative to the first guiding bracket, and the sliding link drives the supporting link to slide and lift relative to the second guiding bracket, so as to drive the keyboard to slide and rise relative to the first body and thus create a spacing between the keyboard and the first body. Accordingly, the heat dissipation efficiency of the electronic device is facilitated. In addition, the keyboard may slide on the first body towards the second body to cover a portion of the frame of the second body. In this way, the visual experience and aesthetics of a slim bezel is exhibited. Since the rising keyboard is inclined to the first body, the disclosure meets the ergonomics better.

DESCRIPTION OF THE EMBODIMENTS

Figure 1A:
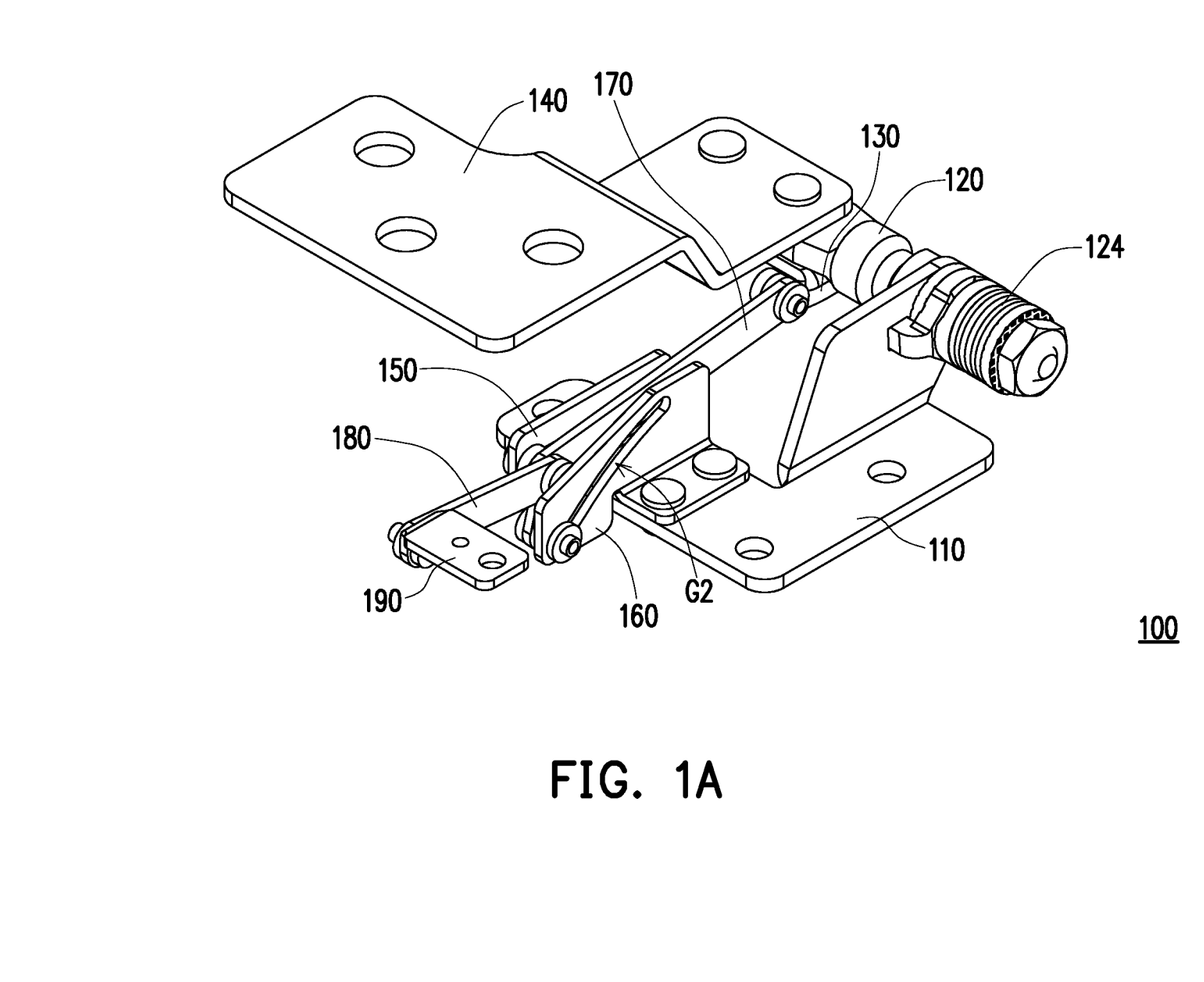
FIG. 1A is a schematic three-dimensional view of a lifting hinge module according to one embodiment of the disclosure.
Figure 1B:
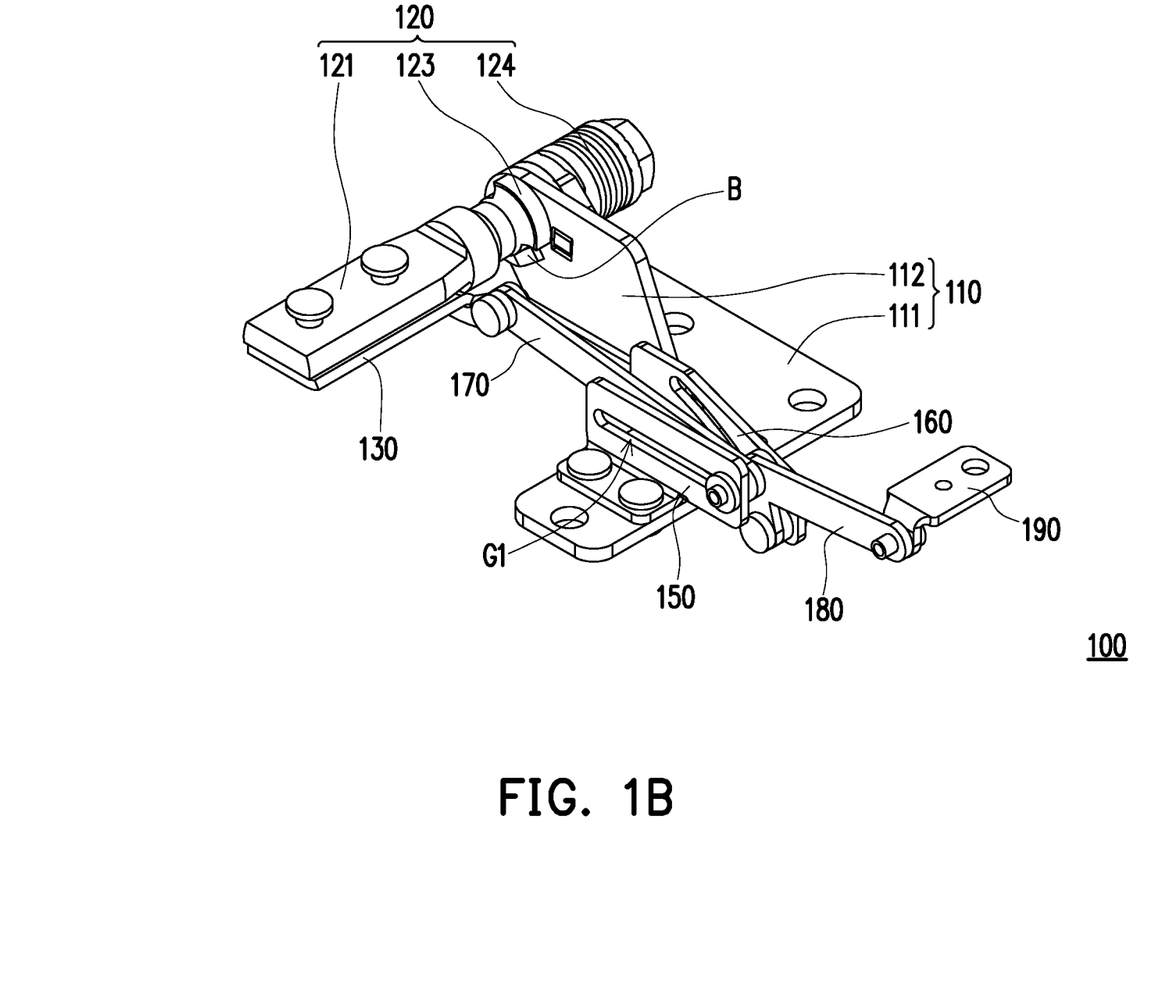
FIG. 1B is a schematic three-dimensional view of the lifting hinge module of FIG. 1A from another direction.
Figure 1C:
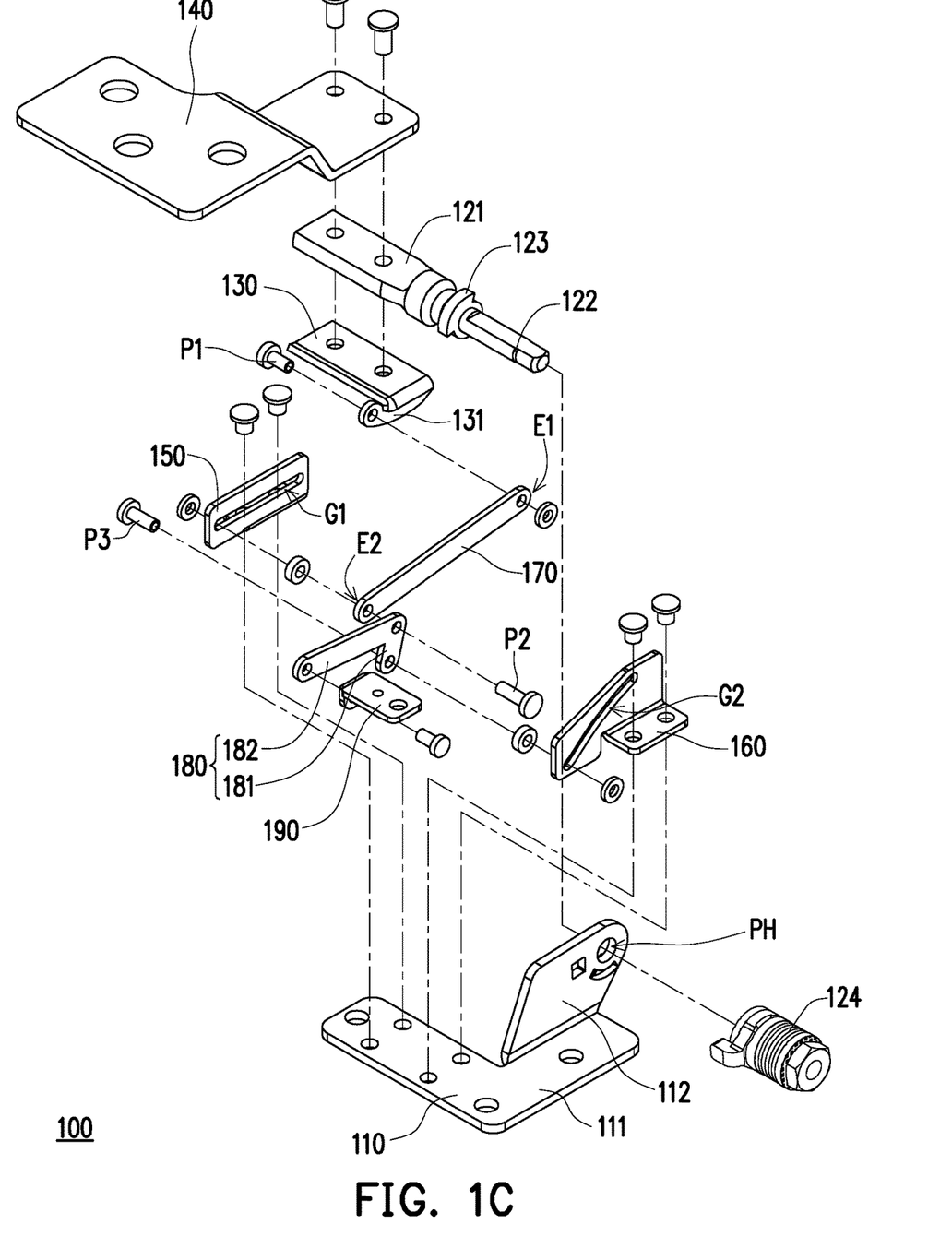
FIG. 1C is a schematic exploded view of components of the lifting hinge module of FIG. 1A.

FIG. 1A is a schematic three-dimensional view of a lifting hinge module according to one embodiment of the disclosure. FIG. 1B is a schematic three-dimensional view of the lifting hinge module of FIG. 1A from another direction. FIG. 1C is a schematic exploded view of components of the lifting hinge module of FIG. 1A.

Referring to FIG. 1A to FIG. 1C, the lifting hinge module 100 of the disclosure includes a first bracket 110, a rotating shaft 120, a driving bracket 130, a second bracket 140, a first guiding bracket 150, a second guiding bracket 160, a sliding link 170, and a supporting link 180.

The first bracket 110 has a bottom plate 111 and an upright plate 112. The upright plate 112 is formed on the bottom plate 111, and has a pivoting hole PH and a stop piece B.

The rotating shaft 120 is rotatably connected to the first bracket 110, and has a mounting portion 121, a pivoting portion 122, a blocking piece 123, and a limiting bearing 124. The pivoting portion 122 penetrates in the pivoting hole PH. The blocking piece 123 is disposed between the mounting portion 121 and the pivoting portion 122. The blocking piece 123 is aligned to the stop piece B of the upright plate 112 to limit a pivoting angle of the rotating shaft 120 relative to the first bracket 110. The limiting bearing 124 is arranged on the pivoting portion 122 in a sleeving manner, and is fastened to the upright plate 112. The limiting bearing 124 generates friction with the pivoting portion 122 to provide torsion.

The driving bracket 130 is disposed on a side of the mounting portion 121 of the rotating shaft 120, and the second bracket 140 is disposed on the other side of the mounting portion 121 of the rotating shaft 120 relative to the driving bracket 130, so that the second bracket 140 and the driving bracket 130 are integrally connected, and adapted to synchronously turn along with the rotating shaft 120. Further, the driving bracket 130 has an eccentric rod 131. When the rotating shaft 120 pivots relative to the first bracket 110, the eccentric rod 131 is adapted to generate eccentric rotation.

The first guiding bracket 150 is disposed on the first bracket 110. The second guiding bracket 160 is disposed on the first bracket 110, and is spaced from the first guiding bracket 150. The first guiding bracket 150 and the second guiding bracket 160 are combined onto the first bracket 110, for example, by fastening or screwing.

The sliding link 170 has a first end E1 and a second E2. The first end E1 is rotatably connected to the driving bracket 130, and the second end E2 is slidably connected to the first guiding bracket 150. In detail, a first pin P1 is pivoted to the first end E1 of the sliding link 170. The supporting link 180 is rotatably connected to the second end E2 of the sliding link 170, and is slidably connected to the second guiding bracket 160.

Figure 2A:
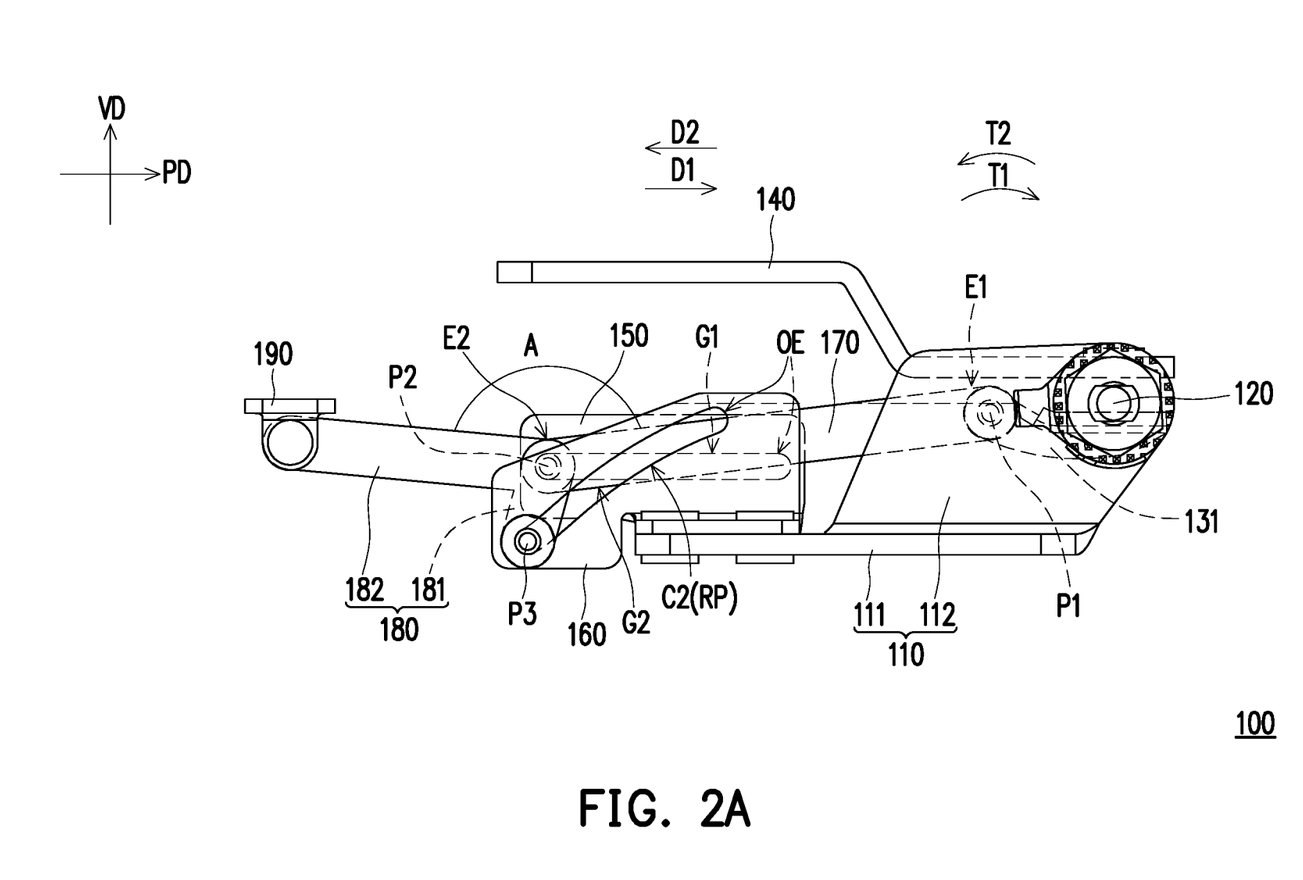
FIG. 2A is a side view of the lifting hinge module of FIG. 1A in a closed state.
Figure 2B:
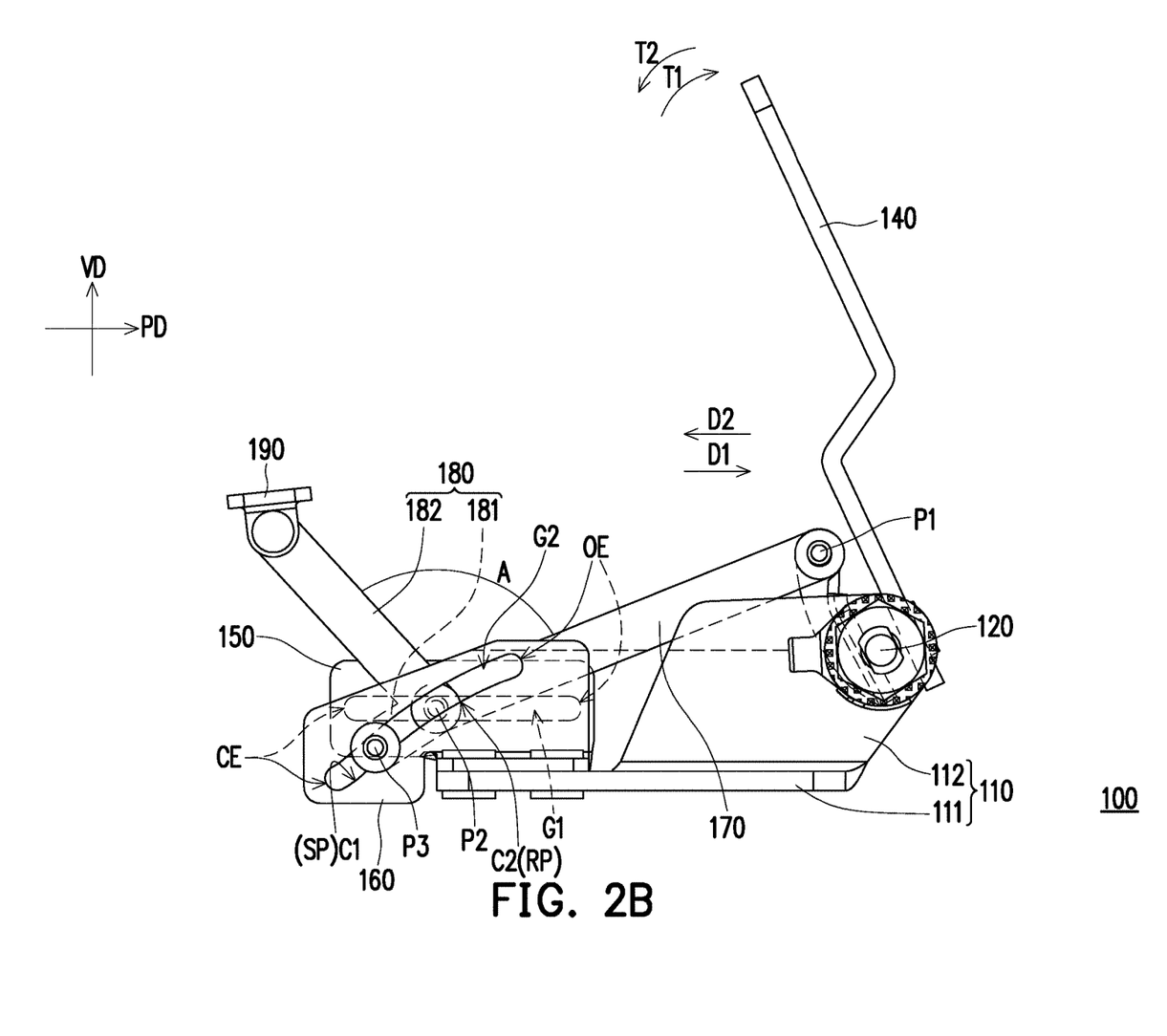
FIG. 2B is a side view of the lifting hinge module of FIG. 2A which is opened at 65 degrees.

FIG. 2A is a side view of the lifting hinge module of FIG. 1A in a closed state. FIG. 2B is a side view of the lifting hinge module of FIG. 2A which is opened at 65 degrees.

Figure 2C:
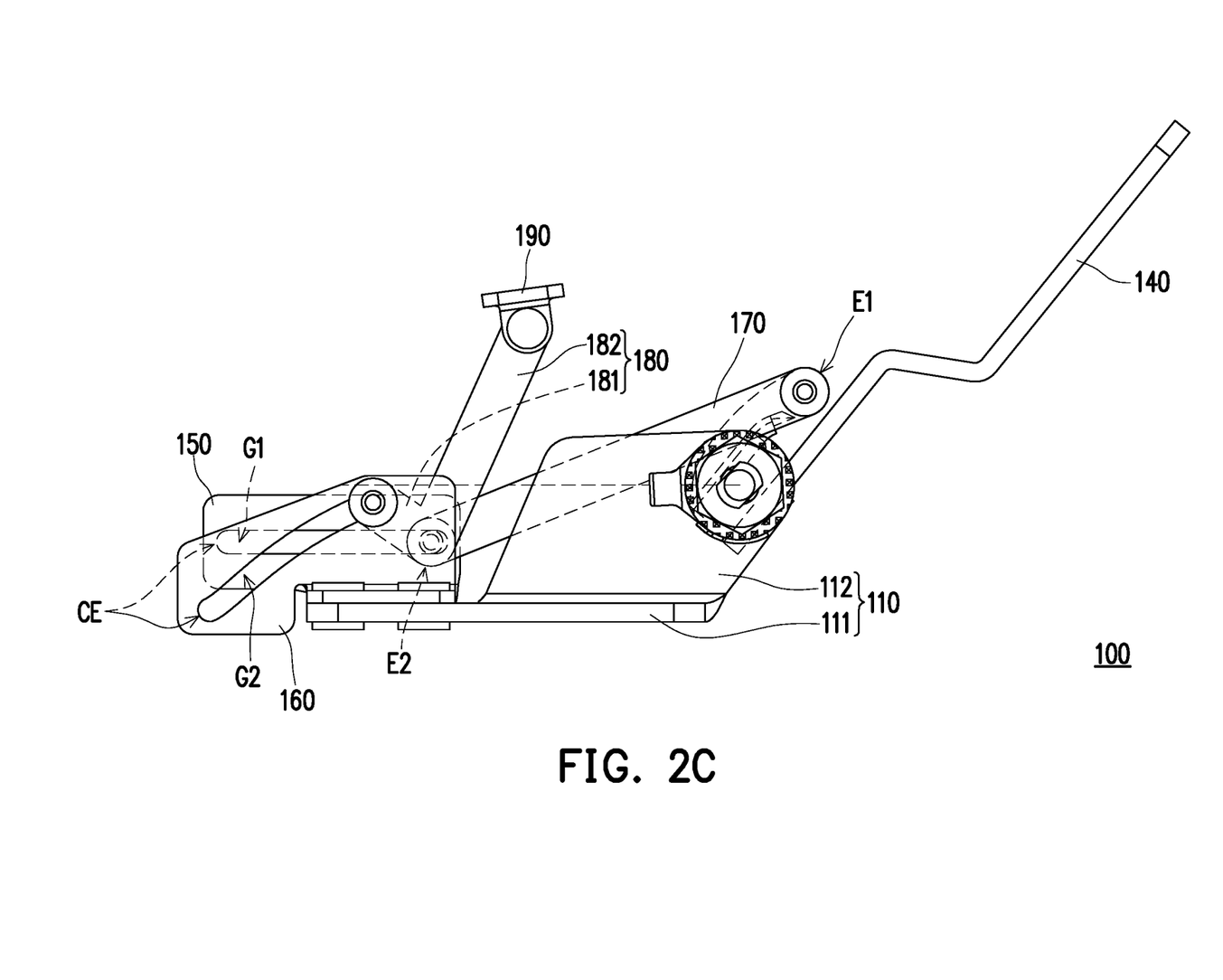
FIG. 2C is a side view of the lifting hinge module of FIG. 2A which is opened at 135 degrees.

FIG. 2C is a side view of the lifting hinge module of FIG. 2A which is opened at 135 degrees.

Referring to FIG. 2A to FIG. 2C, when the pivoting portion 122 of the rotating shaft 120 rotates relative to the upright plate 112 of the first bracket 110, the driving bracket 130 is adapted to drive the second end E2 of the sliding link 170 to slide relative to the first guiding bracket 150, and the sliding link 170 is adapted to drive the supporting link 180 to slide and lift relative to the second guiding bracket 160.

In detail, when the rotating shaft 120 pivots relative to the first bracket 110 towards a first rotating direction T1, the second end E2 of the sliding link 170 slides towards a first direction D1, and gradually approaches the rotating shaft 120, and the first end E1 of the sliding link 170 moves to a position above the rotating shaft 120 along with the eccentric turning of the eccentric rod 131. Meanwhile, the supporting link 180 is driven by the sliding link 170 to slide and rise relative to the second guiding bracket 160, so that an included angle A between the supporting link 180 and the sliding link 170 is gradually decreased.

When the rotating shaft 120 pivots relative to the first bracket 110 towards a second rotating direction T2 opposite to the first rotating direction T1, the second end E2 of the sliding link 170 slides towards a second direction D2 opposite to the first direction D1, and gradually moves away from the rotating shaft 120, and the first end E1 of the sliding link 170 moves to a position in front of the rotating shaft 120 along with the eccentric turning of the eccentric rod 131. Meanwhile, the supporting link 180 is driven by the sliding link 170 to slide and fall relative to the second guiding bracket 160, so that the included angle A between the supporting link 180 and the sliding link 170 is gradually increased.

Further, the supporting link 180 includes a turning portion 181 and a carrying portion 182 which have an included angle less than 90 degrees in the present embodiment. The turning portion 181 is connected to the second end E2 and the second guiding bracket 160, respectively. The carrying portion 182 protrudes out of the first guiding bracket 150 and the second guiding bracket 160. Further, a supporting bracket 190 is included, which is rotatably connected to the carrying portion 182 of the supporting link 180.

Referring to FIG. 1A to FIG. 1C, the first guiding bracket 150 has a first sliding slot G1 formed along a horizontal direction PD. A second pin P2 penetrates in an end of the turning portion 181, adjacent to the carrying portion 182, the second end E2 of the sliding link 170, and the first sliding slot G1, and the second pin P2 is adapted to slide back and forth along the first sliding slot G1, so that the second end E2 of the sliding link 170 and the turning portion 181 of the supporting link 180 synchronously slide relative to the first guiding bracket 150, so as to adjust a relative distance between the sliding link 170, the supporting link 180 and the rotating shaft 120.

The second guiding bracket 160 has a second sliding slot G2 in an arc shape. A third pin P3 penetrates in the other end of the turning portion 181 of the supporting link 180, which is away from the carrying portion 182, and the second sliding slot G2. The third pin P3 is adapted to slide along the second sliding slot G2, so that the supporting link 180 may pivot relative to the sliding link 170 with the second pin P2 as a center, and then an effect that the carrying portion 182 rises or falls relative to the second guiding bracket 160 is achieved.

Referring to FIG. 2A, the second sliding slot G2 includes a sliding section SP and a turning section RP. A bending direction C1 of the sliding section SP is opposite to a bending direction C2 of the turning section RP. Complementally, the sliding section SP is a sunken sliding path for the third pin P3. When the third pin P3 moves on the sliding section SP, the supporting link 180 can be avoided from turning, so that the supporting link 180 only generates displacements on the sliding section SP in the horizontal direction PD and a vertical direction VD.

Further, a closed end CE of the second sliding slot G2 is lower than a closed end CE of the first sliding slot G1, and an open end OE of the second sliding slot G2 is higher than an open end OE of the first sliding slot G1. It is illustrated here that the second pin P2 is limited in the first sliding slot G1 to slide horizontally. When the third pin P3 slides from the closed end CE of the second sliding slot G2 to the open end OE, the supporting link 180 generates the displacements (moving towards the rotating shaft 120 and rising up) in the horizontal direction PD and the vertical direction VD at the same time. The synchronous sliding and rotation of the sliding link 170 and the supporting link 180 are controlled by using a height difference between the first sliding slot G1 and the second sliding slot G2.

With combined reference to FIG. 2A to FIG. 2C, a flow view of an action of switching the lifting hinge module 100 from a closed state to an open state is described below. Firstly, in the closed state of the hinge module 100, the first bracket 110 and the second bracket 140 are parallel to each other, the second pin P2 and the third pin P3 respectively press against the closed end CE of the first sliding slot G1 and the closed end CE of the second sliding slot G2, and the included angle A between the sliding link 170 and the supporting link 180 is the largest. Secondly, an external force F is applied to the second bracket 140 to drive the rotating shaft 120 to pivot relative to the first bracket 110 towards the first rotating direction T1.

Referring to FIG. 2B, the driving bracket 130 rotates along with the rotating shaft 120, and drives the first end E1 of the sliding link 170 through the eccentric rod 131 and the first pin P1, and the second end E2 of the sliding link 170 starts to slide towards the open end OE of the first sliding slot G1. Meanwhile, the second end E2 of the sliding link 170 synchronously drives the supporting link 180 to enable the third pin P3 to start to slide towards the open end OE of the second sliding slot G2. In the process that the supporting link 180 slides, a distance between the third pin P3 in the second sliding slot G2 and the second pin P2 in the first sliding slot G1 is gradually shortened, which causes the turning portion 181 to turn towards the first rotating direction T1 and also causes the carrying portion 182 to turn along with the first rotating direction T1, and the included angle A between the sliding link 170 and the supporting link 180 is gradually decreased.

Referring to FIG. 2C, in the open state of the hinge module 100, an included angle between the first bracket 110 and the second bracket 140 is, for example, opened at 135 degrees (i.e., the blocking piece 123 and the stop piece B press against each other), the second pin P2 and the third pin P3 respectively slide to the open end OE of the first sliding slot G1 and the open end OE of the second sliding slot G2, and the included angle A between the sliding link 170 and the supporting link 180 is the largest.

Figure 3A:
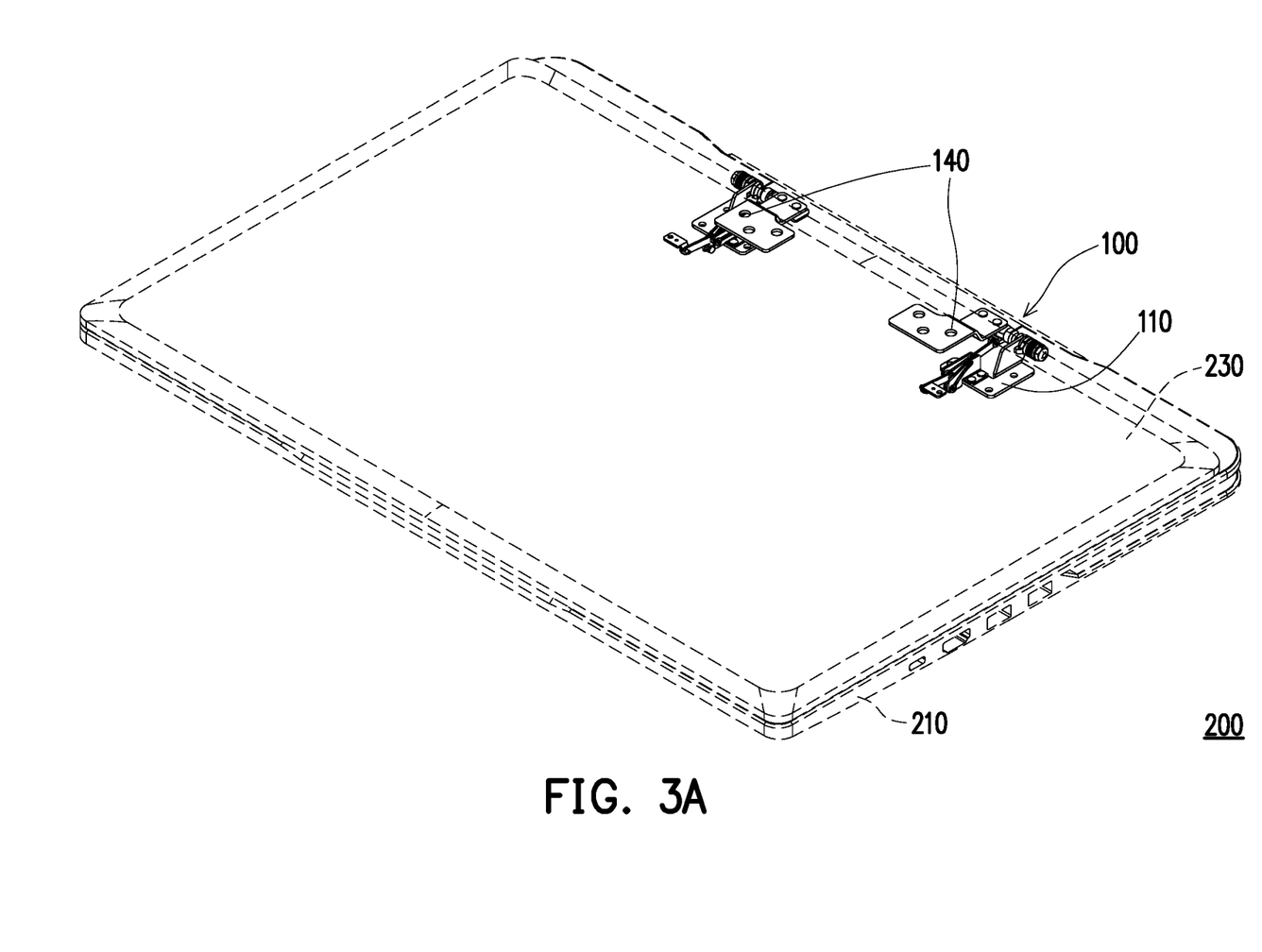
FIG. 3A is a schematic three-dimensional view of an electronic device in a closed state according to one embodiment of the disclosure.
Figure 3B:
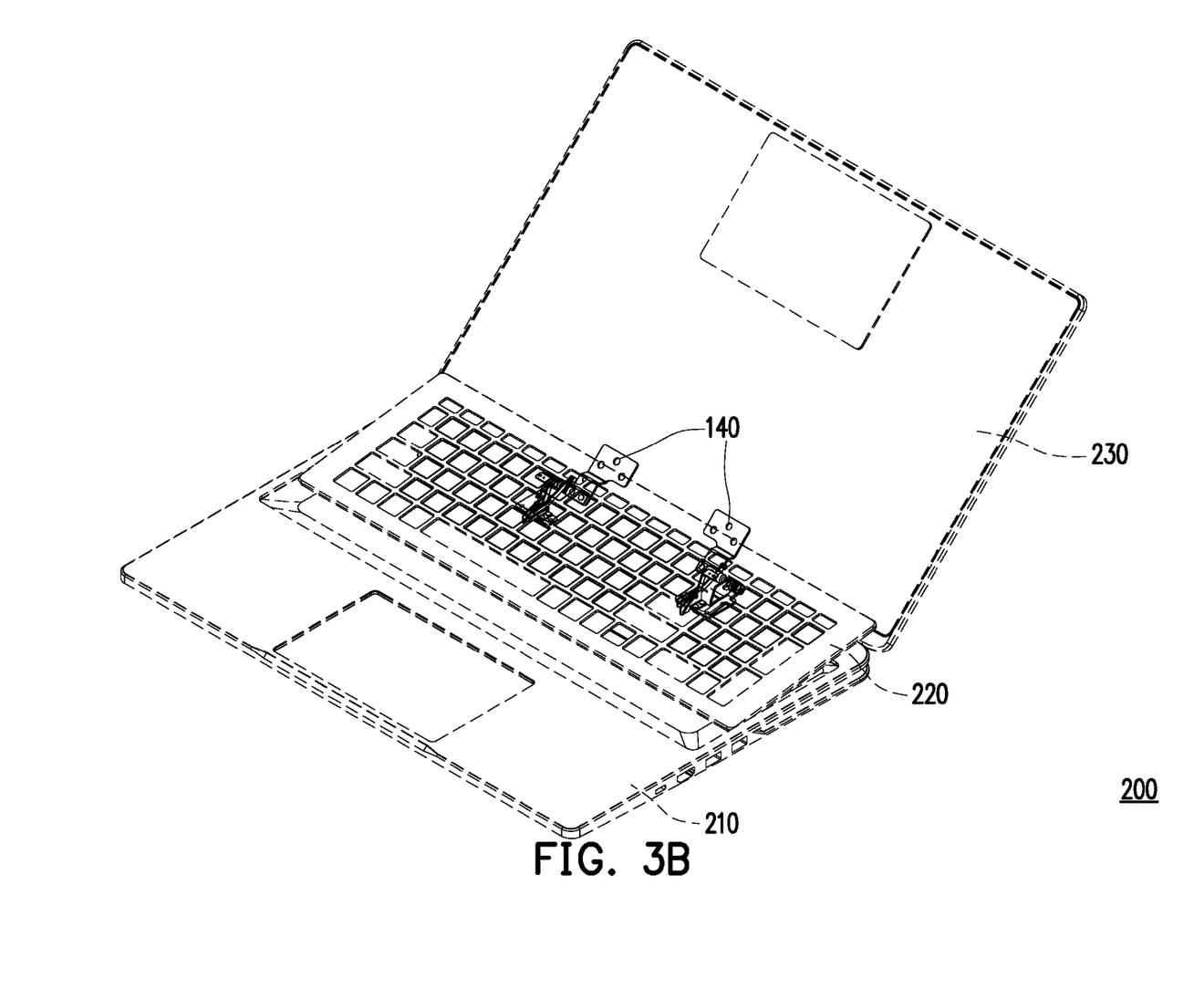
FIG. 3B is a schematic three-dimensional view of the electronic device of FIG. 3A in an open state.
Figure 4A:
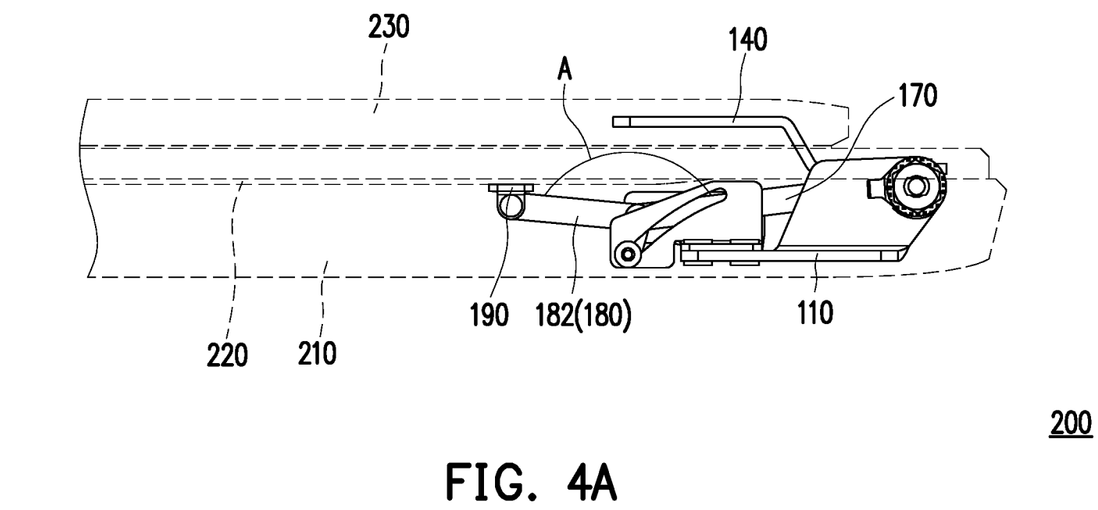
FIG. 4A is a side view of the electronic device of FIG. 3A in a closed state.
Figure 4B:
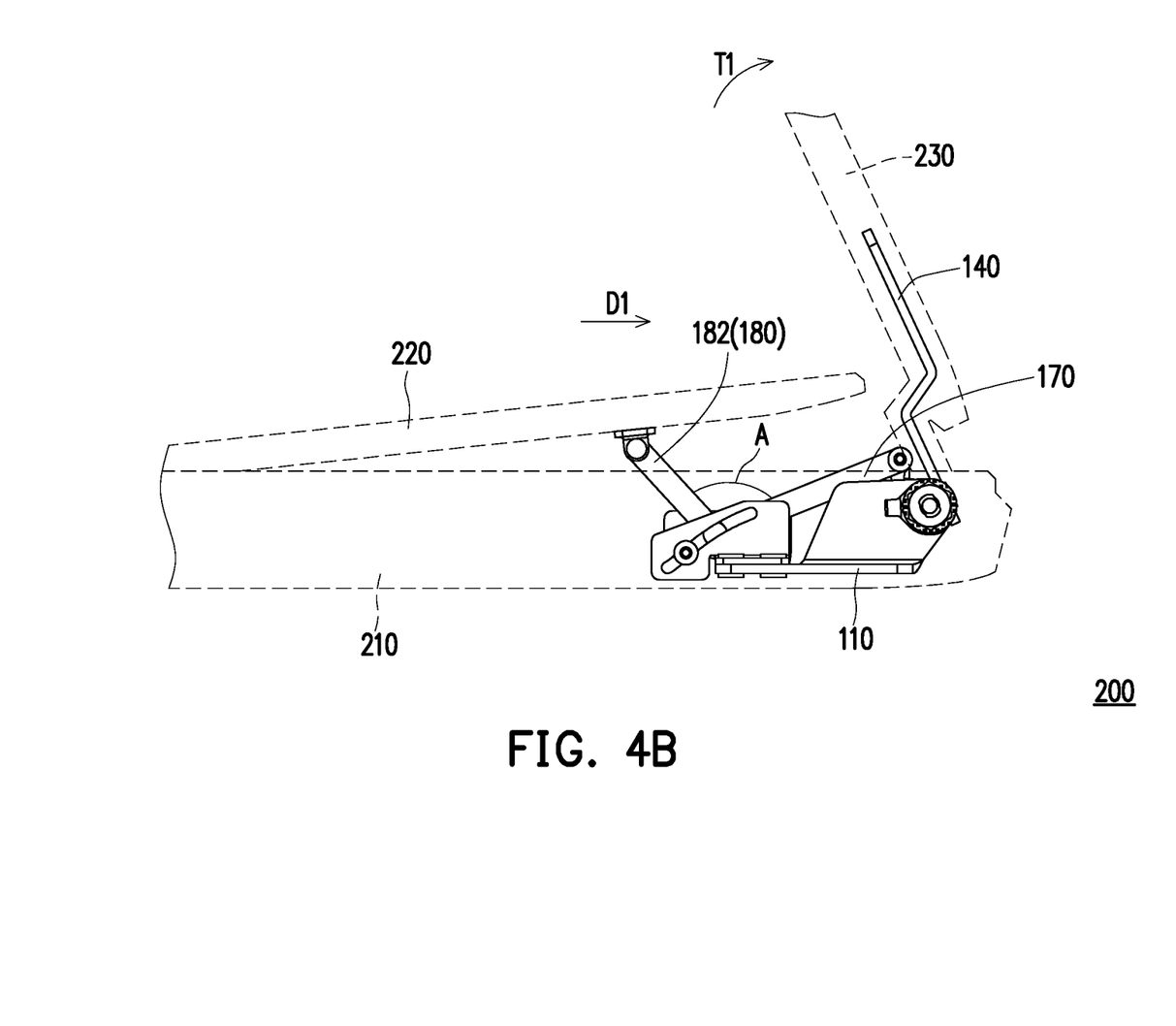
FIG. 4B is a side view of the electronic device of FIG. 4A which is opened at 65 degrees.
Figure 4C:
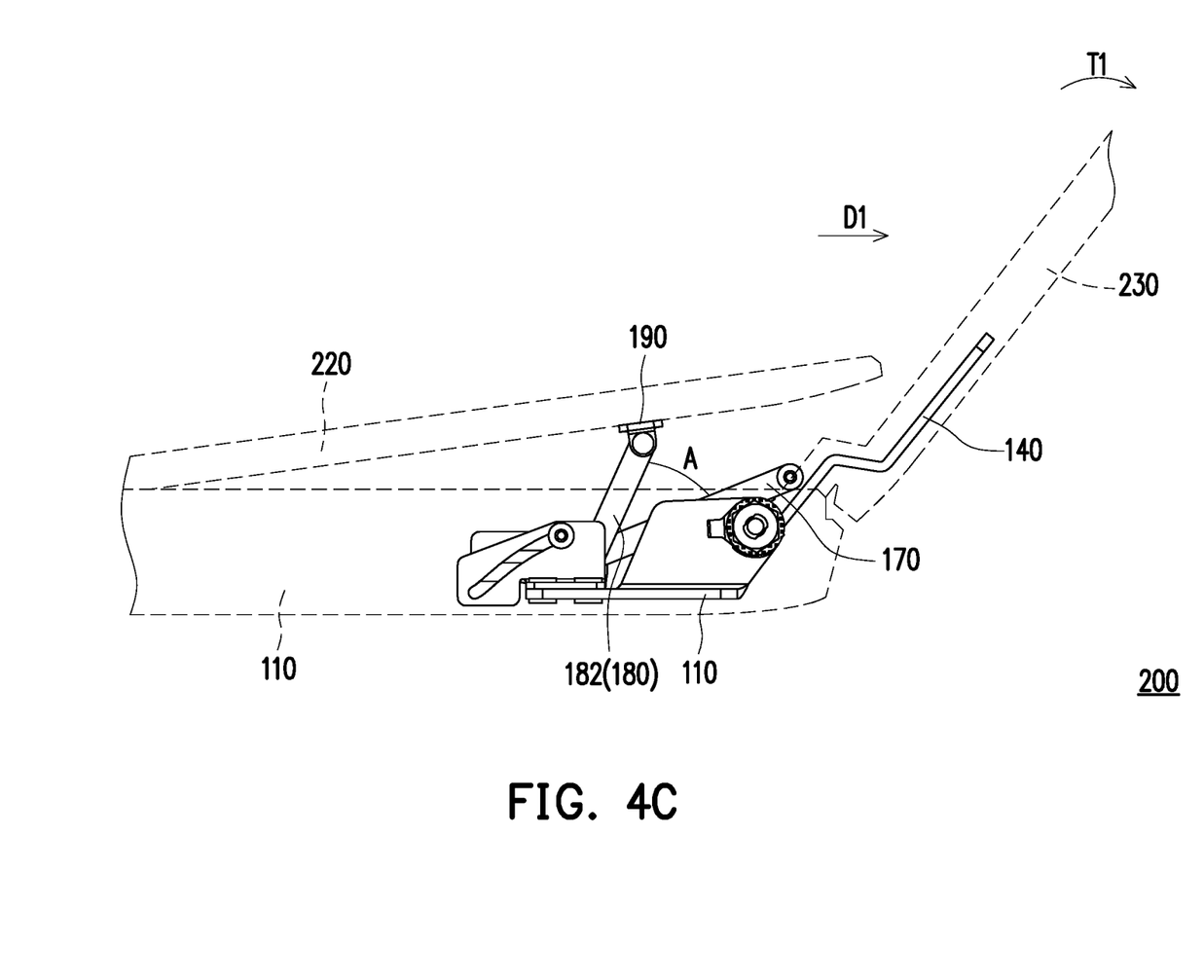
FIG. 4C is a side view of the electronic device of FIG. 4A which is opened at 135 degrees.

FIG. 3A is a schematic three-dimensional view of an electronic device in a closed state according to one embodiment of the disclosure. FIG. 3B is a schematic three-dimensional view of the electronic device of FIG. 3A in an open state. FIG. 4A is a side view of the electronic device of FIG. 3A in a closed state. FIG. 4B is a side view of the electronic device of FIG. 4A which is opened at 65 degrees. FIG. 4C is a side view of the electronic device of FIG. 4A which is opened at 135 degrees.

Referring to FIG. 3A and FIG. 3B, the electronic device 200 of the present embodiment includes a first body 210, a keyboard 220, a second body 230, and at least one lifting hinge module 100 (there are two lifting hinge modules shown in FIG. 3A and FIG. 3B). The electronic device 200 is, for example, a notebook computer, a tablet computer, or other similar products. In the present embodiment, the first body 210 and the second body 230 are respectively a host and a screen of the notebook computer. The first body 210 and the second body 230 are respectively connected to a first bracket 110 and a second bracket 140 of each hinge module 100, so that the first body 210 and the second body 230 can be switched to an open state and a closed state by lifting the hinge modules 100.

The keyboard 220 is disposed on the first body 210, and a supporting bracket 190 is rotatably connected to a carrying portion 182 of a supporting link 180, and is connected to a bottom surface of the keyboard 220. Complementally, the lifting hinge module 100 is configured to synchronously lift the keyboard 220 to be away from the first body 210 and drive the keyboard 220 to slide towards the second body 230.

Referring to FIG. 4A to FIG. 4C, a flow view of an action of switching the electronic device 200 from a closed state to an open state is described below. When the electronic device 200 is in the closed state, the first body 210 and the second body 230 are parallel to each other, and then the second body 230 is enabled to rotate towards a first rotating direction T1. A sliding link 170 drives the supporting link 180 to slide towards a first direction D1, and the supporting link 180 also rotates towards the first rotating direction T1, so that an included angle A between the carrying portion 182 of the supporting link 180 and the sliding link 170 is gradually decreased. That is, the carrying portion 182 gradually rises up. Therefore, the carrying portion 182 drives the keyboard 220 through the supporting bracket 190 to slide and rise relative to the first body 210. Referring to FIG. 4C, when the electronic device 200 is opened at 135 degrees, a spacing exists between the keyboard 220 and the first body 210, which is conductive to improving the heat dissipation efficiency. The keyboard 220 is relatively inclined to the first body 210, so as to meet the ergonomics. In addition, the keyboard 220 slides towards the first direction D1 to cover a portion of the second body 230, which exhibits a slim bezel.

Based on the above, the lifting hinge module of the disclosure is adapted to be connected to the first body, the second body, and the keyboard of the electronic device. When the second body is opened relative to the first body, the second end of the sliding link can be driven by the driving bracket to slide relative to the first guiding bracket, and the sliding link drives the supporting link to slide and lift relative to the second guiding bracket, so that the keyboard is driven to slide and rise relative to the first body to create the spacing between the keyboard and the first body. Accordingly, the heat dissipation efficiency of the electronic device is facilitated. In addition, the keyboard may slide on the first body towards the second body to cover a portion of the frame of the second body. In this way, the visual experience and aesthetics of a slim bezel is exhibited. Since the rising keyboard is inclined to the first body, the disclosure better meets the ergonomics.

What is claimed is:

1. A lifting hinge module, comprising:
   a first bracket;

a rotating shaft, rotatably connected to the first bracket;
a driving bracket, disposed on the rotating shaft;
a first guiding bracket, disposed on the first bracket;
a second guiding bracket, disposed on the first bracket and spaced from the first guiding bracket;
a sliding link, comprising a first end and a second end, wherein the first end is rotatably connected to the driving bracket, and the second end is slidably connected to the first guiding bracket; and
a supporting link, rotatably connected to the second end of the sliding link, and slidably connected to the second guiding bracket,
wherein when the rotating shaft rotates relative to the first bracket, the driving bracket is adapted to drive the second end of the sliding link to slide relative to the first guiding bracket, and the sliding link is adapted to drive the supporting link to slide and lift relative to the second guiding bracket.

2. The lifting hinge module according to claim 1, wherein the driving bracket comprises an eccentric rod, pivoted to the first end of the sliding link through a first pin.

3. The lifting hinge module according to claim 1, wherein the supporting link comprises a turning portion and a carrying portion which comprise an included angle less than 90 degrees, the turning portion is connected to the second end and the second guiding bracket, respectively, and the carrying portion protrudes out of the first guiding bracket and the second guiding bracket.

4. The lifting hinge module according to claim 3, wherein the first guiding bracket comprises a first sliding slot formed along a horizontal direction, a second pin penetrates in an end of the turning portion adjacent to the carrying portion, the second end of the sliding link, and the first sliding slot, and the second pin is adapted to slide along the first sliding slot, so that the second end and the turning portion synchronously slide relative to the first guiding bracket.

5. The lifting hinge module according to claim 4, wherein the second guiding bracket comprises a second sliding slot in an arc shape, a third pin penetrates in the other end of the turning portion, away from the carrying portion, and the second sliding slot, and the third pin is adapted to slide along the second sliding slot, so that the supporting link pivots relative to the sliding link with the second pin as a center.

6. The lifting hinge module according to claim 5, wherein the second sliding slot comprises a sliding section and a turning section, and a bending direction of the sliding section is opposite to a bending direction of the turning section.

7. The lifting hinge module according to claim 5, wherein a closed end of the second sliding slot is lower than a closed end of the first sliding slot, and an open end of the second sliding slot is higher than an open end of the first sliding slot.

8. The lifting hinge module according to claim 1, wherein when the rotating shaft pivots relative to the first bracket towards a first rotating direction, the second end of the sliding link gradually approaches the rotating shaft, the first end moves to a position above the rotating shaft, and an included angle between the supporting link and the sliding link is gradually decreased, and when the rotating shaft pivots relative to the first bracket towards a second rotating direction opposite to the first rotating direction, the second end of the sliding link gradually moves away from the rotating shaft, the first end moves to a position in front of the rotating shaft, and the included angle between the supporting link and the sliding link is gradually increased.

9. The lifting hinge module according to claim 1, further comprising a second bracket, disposed on a side of the rotating shaft, wherein the driving bracket is disposed on the other side of the rotating shaft relative to the second bracket, so that the second bracket and the driving bracket are integrally connected, and adapted to turn synchronously.

10. The lifting hinge module according to claim 3, further comprising a supporting bracket, rotatably connected to the carrying portion of the supporting link.

11. An electronic device, comprising:
a first body, comprising a receiving space;
a keyboard, disposed on the first body;
a second body; and
at least one lifting hinge module, disposed between the first body and the second body, wherein the at least one lifting hinge module comprises:
a first bracket, connected to the first body;
a rotating shaft, rotatably connected to the first bracket;
a driving bracket, disposed on the rotating shaft;
a second bracket, disposed on the rotating shaft and connected to the second body;
a first guiding bracket, disposed on the first bracket;
a second guiding bracket, disposed on the first bracket and spaced from the first guiding bracket;
a sliding link, comprising a first end and a second end, wherein the first end is rotatably connected to the driving bracket, and the second end is slidably connected to the first guiding bracket; and
a supporting link, rotatably connected to the second end of the sliding link, slidably connected to the second guiding bracket, and connected to the keyboard,
wherein when the second body and the second bracket drive the rotating shaft to rotate relative to the first bracket, the driving bracket is adapted to drive the second end of the sliding link to slide relative to the first guiding bracket, and the sliding link is adapted to drive the supporting link to slide and lift relative to the second guiding bracket, so that the keyboard slides and lift relative to the first body.

12. The electronic device according to claim 11, wherein the driving bracket comprises an eccentric rod pivoted to the first end of the sliding link through a first pin.

13. The electronic device according to claim 11, wherein the supporting link comprises a turning portion and a carrying portion which comprise an included angle less than 90 degrees, the turning portion is connected to the second end and the second guiding bracket, respectively, and the carrying portion protrudes out of the first guiding bracket and the second guiding bracket.

14. The electronic device according to claim 13, wherein the first guiding bracket comprises a first sliding slot formed along a horizontal direction, a second pin penetrates in an end of the turning portion adjacent to the carrying portion, the second end of the sliding link, and the first sliding slot, and the second pin is adapted to slide along the first sliding slot, so that the second end and the turning portion synchronously slide relative to the first guiding bracket.

15. The electronic device according to claim 14, wherein the second guiding bracket comprises a second sliding slot in an arc shape, a third pin penetrates in the other end of the turning portion, away from the carrying portion, and the second sliding slot, and the third pin is adapted to slide along the second sliding slot, so that the supporting link pivots relative to the sliding link with the second pin as a center.

16. The electronic device according to claim 15, wherein the second sliding slot comprises a sliding section and a turning section, and a bending direction of the sliding section is opposite to a bending direction of the turning section.

17. The electronic device according to claim 15, wherein a closed end of the second sliding slot is lower than a closed end of the first sliding slot, and an open end of the second sliding slot is higher than an open end of the first sliding slot.

18. The electronic device according to claim 11, wherein when the rotating shaft pivots relative to the first bracket towards a first rotating direction, the second end of the sliding link gradually approaches the rotating shaft, the first end moves to a position above the rotating shaft, and an included angle between the supporting link and the sliding link is gradually decreased, when the rotating shaft pivots relative to the first bracket towards a second rotating direction opposite to the first rotating direction, the second end of the sliding link gradually moves away from the rotating shaft, the first end moves to a position in front of the rotating shaft, and the included angle between the supporting link and the sliding link is gradually increased.

19. The electronic device according to claim 11, wherein the second bracket is disposed on a side of the rotating shaft, the driving bracket is disposed on the other side of the rotating shaft relative to the second bracket, so that the second bracket and the driving bracket are integrally connected and adapted to turn synchronously.

20. The electronic device according to claim 13, further comprising a supporting bracket rotatably connected to the carrying portion of the supporting link and connected to the keyboard.

* * * * *